US010855039B2

(12) United States Patent
Zizzadoro

(10) Patent No.: US 10,855,039 B2
(45) Date of Patent: Dec. 1, 2020

(54) VEHICULAR SECURITY BYPASS

(71) Applicant: Joseph P. Zizzadoro, Commack, NY (US)

(72) Inventor: Joseph P. Zizzadoro, Commack, NY (US)

(*) Notice: Subject to any disclaimer, the term of this patent is extended or adjusted under 35 U.S.C. 154(b) by 0 days.

(21) Appl. No.: 16/587,487

(22) Filed: Sep. 30, 2019

(65) Prior Publication Data
US 2020/0203907 A1 Jun. 25, 2020

Related U.S. Application Data

(63) Continuation of application No. 16/165,902, filed on Oct. 19, 2018, now Pat. No. 10,431,946.

(60) Provisional application No. 62/574,422, filed on Oct. 19, 2017.

(51) Int. Cl.
| | |
|---|---|
| *H01R 31/08* | (2006.01) |
| *G06F 21/85* | (2013.01) |
| *H01R 13/66* | (2006.01) |
| *G06F 13/40* | (2006.01) |

(52) U.S. Cl.
CPC ......... *H01R 31/08* (2013.01); *G06F 13/4004* (2013.01); *G06F 21/85* (2013.01); *H01R 13/6683* (2013.01); *H01R 2201/26* (2013.01)

(58) Field of Classification Search
CPC .... H01R 31/08; H01R 31/085; G06F 13/4004
See application file for complete search history.

(56) References Cited

U.S. PATENT DOCUMENTS

| | | | | |
|---|---|---|---|---|
| 7,225,065 | B1* | 5/2007 | Hunt | B60R 16/0207 |
| | | | | 701/33.2 |
| 8,192,227 | B2* | 6/2012 | Gentner | H01R 31/08 |
| | | | | 439/511 |
| 8,676,439 | B2* | 3/2014 | Huang | B60R 16/0232 |
| | | | | 701/33.2 |
| 9,281,647 | B2* | 3/2016 | Krivtsov | H01R 27/02 |
| 9,419,392 | B2* | 8/2016 | Kirkpatrick | H01R 13/6683 |
| 9,941,633 | B2* | 4/2018 | Simonazzi | H01R 43/205 |
| 10,431,946 | B2* | 10/2019 | Zizzadoro | G06F 21/85 |
| 2015/0064972 | A1* | 3/2015 | Jones | B60R 16/02 |
| | | | | 439/620.21 |
| 2017/0288353 | A1* | 10/2017 | Sumskas | H01R 43/0256 |
| 2019/0123499 | A1* | 4/2019 | Zizzadoro | H01R 13/6683 |

\* cited by examiner

*Primary Examiner* — Ross N Gushi
(74) *Attorney, Agent, or Firm* — Haley Guiliano LLP

(57) ABSTRACT

An illustrative electrical harness for bypassing a vehicular security module includes first, second, and third connectors, and electrical conductors. The electrical conductors electrically couple a first pin of the first connector to a third pin of the third connector, a second pin of the first connector to an eleventh pin of the third connector, a first pin of the second connector to a fourteenth pin of the third connector, and a second pin of the second connector to a sixth pin of the third connector. When the first connector is mated with a connector of a first communication bus of a vehicle and the second connector is mated with a connector of a second communication bus of the vehicle, the third connector is configured to bypass the vehicular security module by providing access to a diagnostic port of electrical modules coupled to the first or second communication buses.

18 Claims, 5 Drawing Sheets

VEHICULAR SECURITY BYPASS

CROSS-REFERENCE TO RELATED APPLICATION

This application is a continuation of U.S. patent application Ser. No. 16/165,902, filed Oct. 29, 2018, which claims the benefit under 35 U.S.C. § 119(e) of commonly owned U.S. Provisional Patent Application No. 62/574,422, filed on Oct. 19, 2017, which are hereby incorporated by reference herein in their entireties.

BACKGROUND

For security reasons, some vehicles are equipped with a gateway module—which is sometimes referred to as a security gateway module (SGW), a central gateway module (CGW), or the like—that limits and/or altogether prevents access to certain electronic subsystems or modules of the vehicle, for instance, which may otherwise have been accessible via an onboard diagnostic (e.g., OBD2) port of the vehicle. Appendices A, B, C, D, E, F, and G which were obtained from https://www.techauthority.com/(last accessed on Oct. 17, 2017) and are hereby incorporated by reference herein in their entireties, are diagrams that illustrate aspects of an example security gateway module and its arrangement within an electrical circuit of a vehicle, such as a Fiat Chrysler automobile. In some instances, it may be desirable to electronically access certain electronic vehicle subsystems or modules unimpeded by the limitations or prevention that the security gateway module would otherwise effect. Given the foregoing, a need exists for a means of bypassing the limits put in place by the security gateway module.

SUMMARY

In accordance with an aspect of the present disclosure, systems and methods for vehicular security bypass are provided, which enable or electronic access to certain electronic vehicle subsystems or modules free from the limits or prevention that the security gateway module would otherwise effect.

In a first embodiment of the present disclosure, a system and method are described herein that facilitate the bypassing of the security gateway module via an electrical harness that includes an additional port (e.g., another OBD2 port) by which certain electronic vehicle modules can be accessed. The electrical harness includes a first connector having a first pin and a second pin; a second connector having a first pin and a second pin; a third connector having a plurality of pins; and a plurality of electrical conductors. The first pin of the first connector is electrically coupled to a third pin of the plurality of pins of the third connector via a first conductor of the plurality of electrically conductors. The second pin of the first connector is electrically coupled to an eleventh pin of the plurality of pins of the third connector via a second conductor of the plurality of electrical conductors. The first pin of the second connector is electrically coupled to a fourteenth pin of the plurality of pins of the third connector via a third conductor of the plurality of electrical conductors. The second pin of the second connector is electrically coupled to a sixth pin of the plurality of pins of the third connector via a fourth conductor of the plurality of electrical conductors.

In one aspect, the first connector is configured to mate with a first communication bus connector coupled to a first communication bus of an automotive vehicle, and the second connector is configured to mate with a second communication bus connector coupled to a second communication bus of the automotive vehicle. When the first connector is mated with the first communication bus connector and the second connector is mated with the second communication bus connector, the third connector may be configured to provide electronic access to a diagnostic port of one or more electrical modules coupled to the first communication bus or the second communication bus.

In some implementations, the first communication bus may be a controller area network interior high speed (CAN-IHS) bus and the second communication bus may be a controller area network C (CAN-C) bus. In such implementations, the first connector may be a CAN-IHS-compatible connector, the second connector may be a CAN-C-compatible connector, and the third connector may be an on-board diagnostic (OBD)-compatible connector, such as an OBD2 connector.

In some aspects, the electrical harness may further include a power connector and a ground connector, with the power connector electrically coupled to a sixteenth pin of the third connector via a fifth conductor of the electrical conductors, and the ground connector electrically coupled to a fourth pin and a fifth pin of the third connector via a sixth conductor of the electrical conductors. The power connector may be couplable to battery power of an automotive vehicle and the ground connector may be couplable to chassis ground of the automotive vehicle.

In a second embodiment of the present disclosure, an apparatus described herein facilitates the bypassing of the security gateway module via an electrical connector having certain pins bridged to one another to enable certain electronic vehicle modules to be accessed via the port (e.g., OBD2 port) originally installed on the vehicle. The apparatus includes: a first connector having a plurality of pins; and a second connector having a plurality of pins. A third pin, a fourth pin, and a fifth pin of the first connector are electrically coupled to one another via a first electrical conductor. A tenth pin, an eleventh pin, and a twelfth pin of the first connector are electrically coupled to one another via a second electrical conductor. A first pin, a second pin, and a third pin of the second connector are electrically coupled to one another via a third electrical conductor. A sixth pin, a seventh pin, and an eight pin of the second connector are electrically coupled to one another via a fourth electrical conductor. The first, second, third, and/or fourth electrical conductors may include one or more jumpers in various implementations.

In some aspects, the first connector bypasses a vehicular security module of an automotive vehicle by replacing a first connector of the vehicular security module in a first electrical circuit comprising a first communication bus of the automotive vehicle. The first connector may replace the first connector of the vehicular security module by mating with a first communication bus connector coupled to the first communication bus in place of the first connector of the vehicular security module. In some implementations, the first communication bus may be a CAN-C bus.

In some examples, the second connector bypasses a vehicular security module of an automotive vehicle by replacing a second connector of the vehicular security module in a second electrical circuit comprising a second communication bus of the automotive vehicle. The second connector may replace the second connector of the vehicular security module by mating with a second communication bus connector coupled to the second communication bus in place of the second connector of the vehicular security module. The second communication bus may be a CAN-IHS bus.

The apparatus, in some instances, may further include a diagnostic port (e.g., an originally installed on-board diagnostic port of a vehicle) coupled to the vehicular security module. In such instances, when the first connector is mated with a first communication bus connector of a first communication bus of the automotive vehicle and the second connector is mated with a second communication bus connector of a second communication bus of the automotive vehicle, the diagnostic port may be configured to provide electronic access to an electrical module diagnostic port of one or more electrical modules coupled to the first communication bus or the second communication bus.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In general, the systems and methods herein enable access to certain electronic vehicle components (e.g., an air conditioner/heater module, a driver or passenger door module, a radio amplifier module, a body control module, a blind spot detection module, or the like) by bypassing the security gateway module of the vehicle. In some aspects, the systems and methods described herein facilitate bypassing of security gateway module by taking advantage of certain characteristics, pinouts, and/or wiring configurations of security gateway modules of certain vehicles, such as, by way of a non-limiting example, Fiat Chrysler automobiles, or the like.

Figure 1:
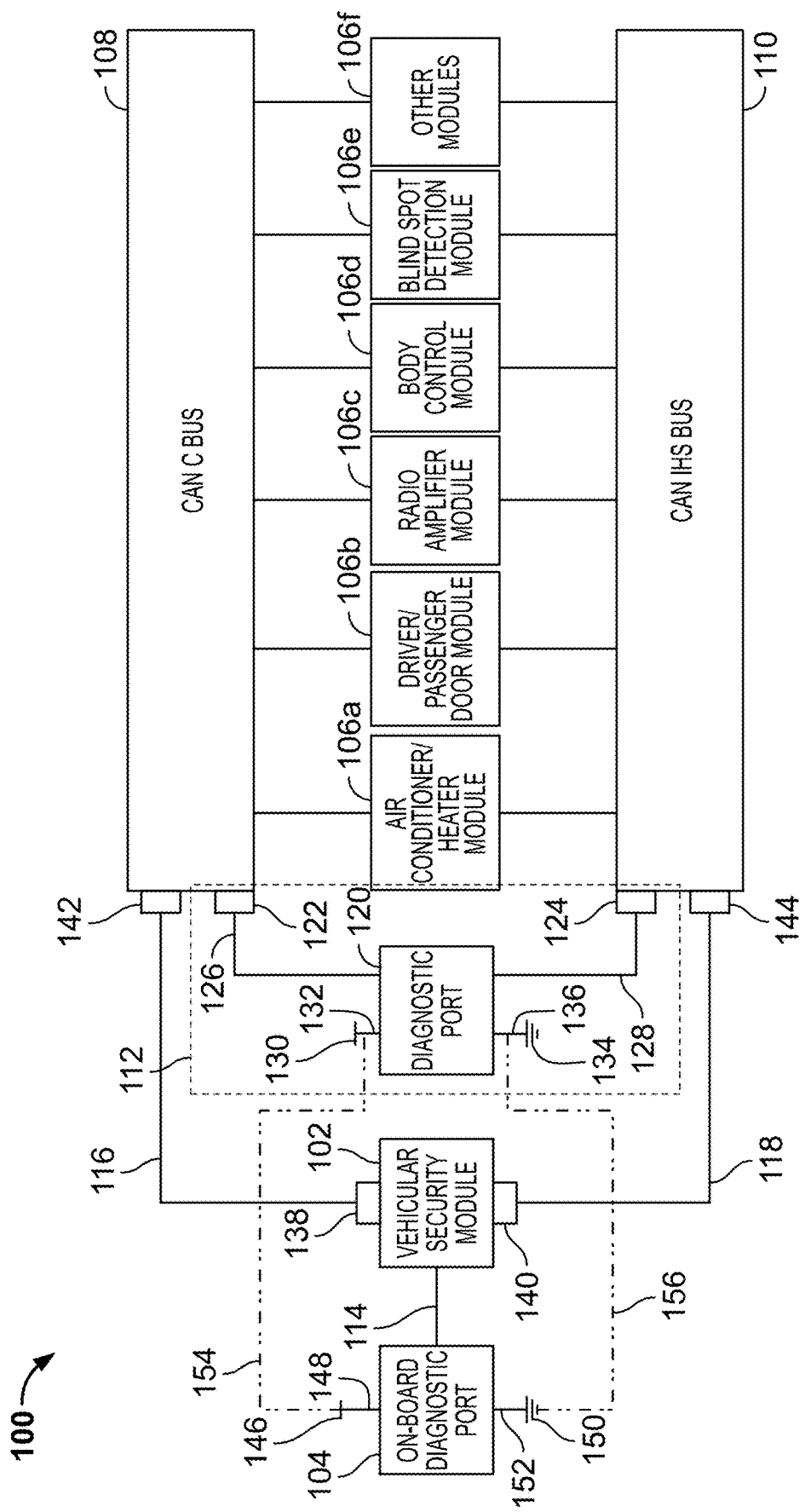
FIG. 1 is a block diagram including an example electrical harness for bypassing a vehicular security module, in accordance with a first embodiment of the present disclosure.
Figure 2:
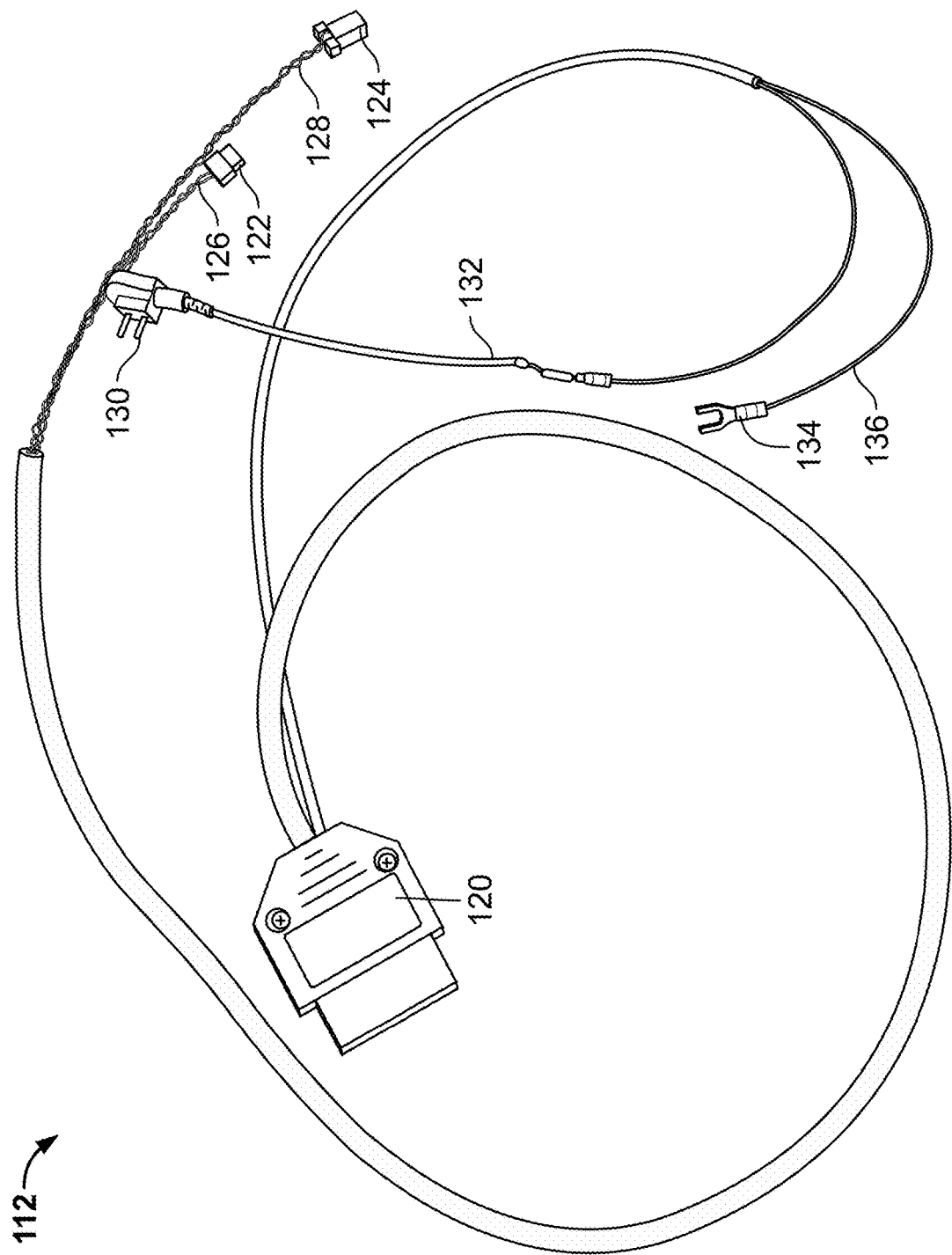
FIG. 2 shows one implementation of the electrical harness shown in FIG. 1, in accordance with the first embodiment.
Figure 3:
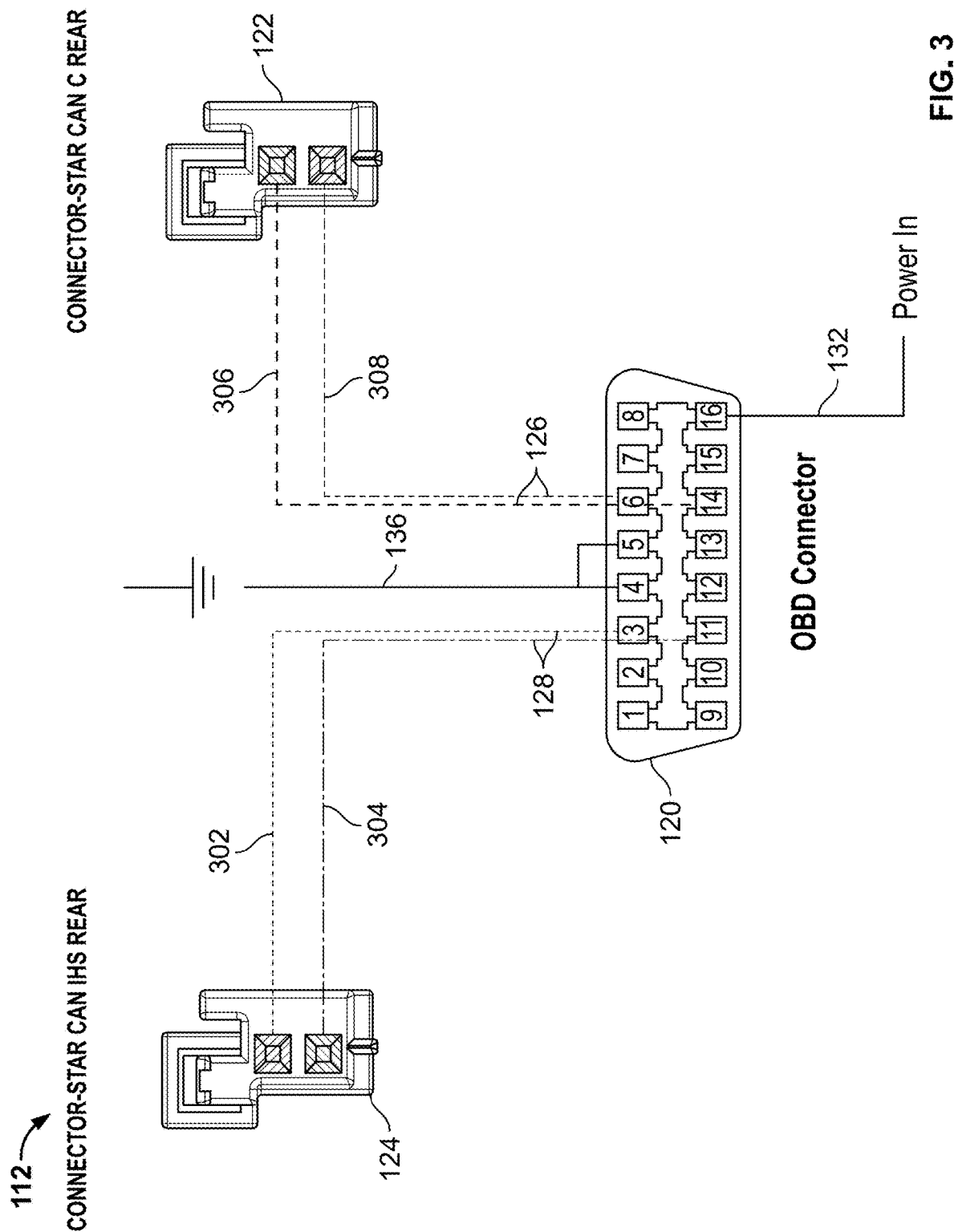
FIG. 3 shows pinouts and additional details regarding the electrical harness of the first embodiment.

FIG. 1 is a block diagram of a system 100 including an example electrical harness 112 for bypassing a vehicular security module 102, in accordance with a first embodiment of the present disclosure. FIG. 2 shows one example implementation of the electrical harness 112 shown in FIG. 1, in accordance with the first embodiment. FIG. 3 shows pinouts and additional details regarding the electrical harness 112 of the first embodiment. With reference to FIGS. 1 through 3, the system 100 includes a vehicular security module 102, an on-board diagnostic (OBD) port 104, and a variety of electronic modules 106a through 106f (collectively, 106) that are coupled to a vehicular bus (e.g., a CAN C bus) 108 and a vehicular bus (e.g., CAN IHS bus) 110. OBD port 104 is coupled to vehicular security module 102 via conductor path 114. OBD port 104 is coupled to power (e.g., vehicle battery power) via conductor 148 and connector 146, and is coupled to ground (e.g., vehicle chassis ground) via conductor 152 and connector 150. Vehicular security module 102 is coupled to the modules 106 via a path including connector 138, conductor 116, connector 142, and CAN C bus 108. Vehicular security module 102 is also coupled to the modules 106 via a second path including connector 140, conductor 118, connector 144, and CAN IHS bus 110.

Electrical harness 112 includes first connector 124, second connector 122, and diagnostic port (e.g., third connector) 120. Although electrical harness 112 shown in FIG. 1 includes both first connector 124 and second connector 122, in some embodiments, electrical harness 112 may include either first connector 124 (e.g., for coupling to CAN-C bus 108) or second connector 122 (e.g., for coupling to CAN-IHS bus 110), but not both. In some examples, first connector 124 may be a CAN-IHS-compatible connector, such as a TE Connectivity/AMP connector having part number 5-2138650-1 and second connector 122 may be a CAN-C-compatible connector, such as a TE Connectivity/AMP connector having part number 2-2138650-1. Electrical harness 112 also includes power connector 130, power conductor 132, ground connector 134, and ground conductor 136. As shown in FIG. 3, pin 1 of first connector 124 is electrically coupled to pin 3 of third connector 120 via electrical conductor 302. Pin 2 of first connector 124 is electrically coupled to pin 11 of third connector 120 via electrical conductor 304. Pin 1 of second connector 122 is electrically coupled to pin 14 of third connector 120 via electrical conductor 306. Pin 2 of second connector 122 is electrically coupled to pin 6 of third connector 120 via electrical conductor 308. Pins 4 and 5 of third connector 120 are electrically coupled to chassis ground of the vehicle via electrical conductor 136. Pin 16 of third connector 120 is electrically coupled to vehicle battery power via conductor 132. In some embodiments, electrical harness 112 may receive power and/or ground from any other suitable source in the vehicle. For example, electrical harness 112 may receive power from OBD port 104 (e.g., via conductor 148, connector 146, and conductor 154), and may be coupled to ground via OBD port 104 (e.g., via conductor 152, connector 150, and conductor 156).

Electrical harness 112 is installed in a vehicle to bypass vehicular security module 102. In particular, electrical harness 112 is configured to mate with modules 106 via conductor 126, connector 122, and CAN C bus 108, and also mate with modules 106 via conductor 128, connector 124, and via CAN-IHS bus 110. Electrical harness 112 is configured to be coupled to power (e.g., vehicle battery power) via conductor 132 and connector 130, and be coupled to ground (e.g., vehicle chassis ground) via conductor 136 and connector 134. In one example, for instance, the electrical harness is installed into the vehicle by connecting first connector 124 to the STAR CAN IHS REAR connector of the vehicle (not separately shown in FIG. 1) and connecting second connector 122 to the STAR CAN C REAR connector of the vehicle (not separately shown in FIG. 1), although as one of skill in the art would appreciate, other configurations are also contemplated. Once electrical harness 112 has been installed in the vehicle in this manner, access to various electronic modules 106 of the vehicle is facilitated by way of third connector 120 of the electrical harness 112. For instance, in some examples, electrical harness 112 installed in this manner provides access to modules 106 that reside on the same side of the vehicle bus (e.g., bus 108 and/or bus 110) on which electrical harness 112 is installed, at least in part because the vehicular security module 102, in this configuration, is no longer electrically located between diagnostic port 120 (e.g., the third connector) and at least some of the electronic components 106 of the vehicle.

Figure 4:
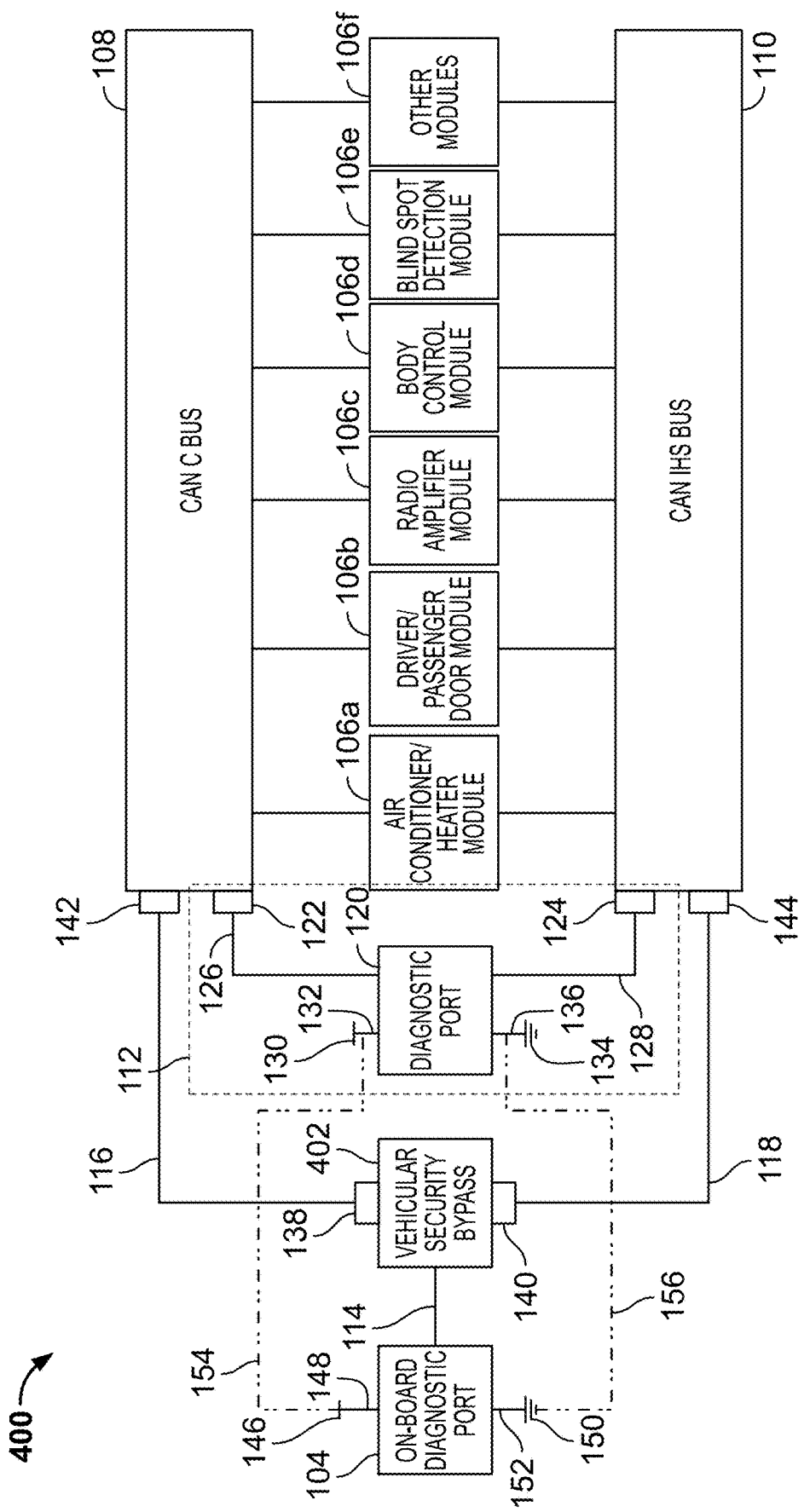
FIG. 4 is a block diagram including an example apparatus for bypassing a vehicular security module, in accordance with a second embodiment of the present disclosure.
Figure 5:
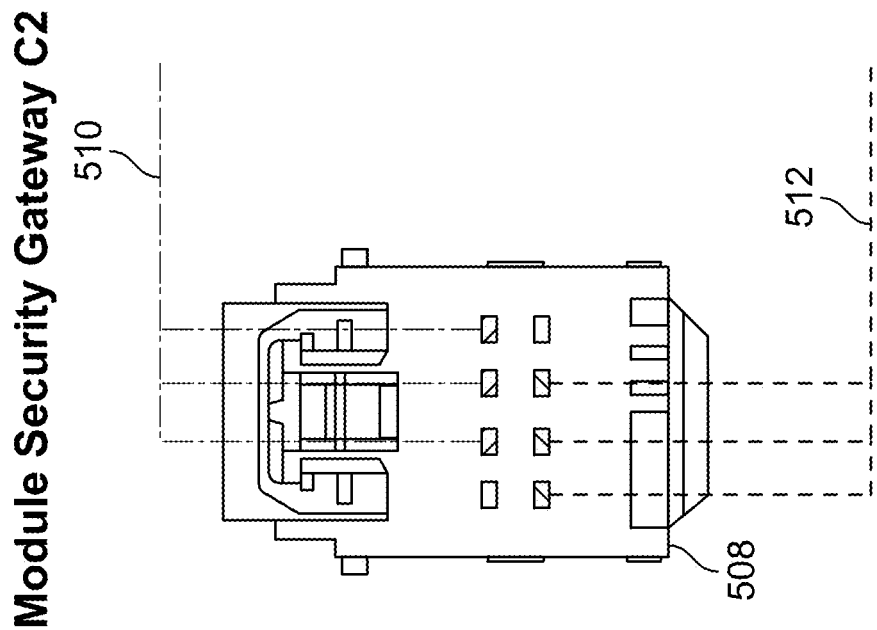
FIG. 5 shows pinouts and additional details regarding the apparatus of the second embodiment.
Figure 5:
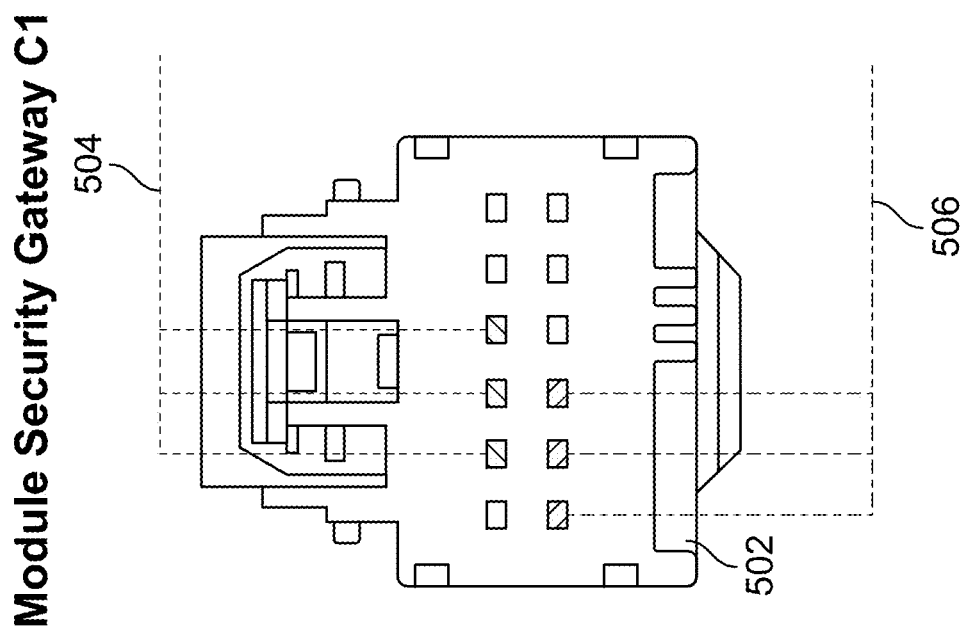

FIG. 4 is a block diagram 400 including an example apparatus for bypassing a vehicular security module, in accordance with a second embodiment of the present disclosure. FIG. 4 shows many components already described above in the context of FIG. 1, and so descriptions of those components are not repeated here. FIG. 5 shows pinouts and additional details regarding the apparatus of the second embodiment. In accordance with the second embodiment, the vehicular security module (e.g., module 102 shown in FIG. 1) is replaced with vehicular security bypass apparatus 402 which includes connectors 502 and 508 having certain pins bridged to one another, and is installed in the vehicle to replace a corresponding electrical connector of the vehicular security gateway module that would otherwise be electrically coupled to the data link connector and to other vehicle modules 106. Connector 502 is coupled to CAN C bus 108 via connector 138 of conductor 116, and connector 508 is coupled to CAN-HSI bus 110 via connector 140 of conductor 118. As shown in FIG. 5, in connector 502, pins 3, 4 and 5 are electrically coupled (e.g., bridged) to one another via electrical conductors 504 (e.g., one or more jumpers), and pins 10, 11, and 12 are bridged to one another via electrical conductors 506 (e.g., one or more jumpers). In the connector 508, pins 1, 2, and 3 are bridged to one another via electrical conductors 510 (e.g., one or more jumpers), and pins 6, 7, and 8 are bridged to one another via electrical conductors 512 (e.g., one or more jumpers). Once constructed with the pins bridged as described above, connectors 502 and 508 are installed in the vehicle as vehicular security bypass apparatus 402 in place of the security gateway module as described above. Once vehicular security bypass apparatus 402 is installed in this manner, access to various electronic modules of the vehicle is facilitated by way of on-board diagnostic port 104 (e.g., the OBD2 port) that is originally installed in the vehicle. For instance, in some examples, vehicular security bypass apparatus 402 installed in this manner provides access to substantially all the electronic components (e.g., modules 106) that reside on the vehicle buses 108 and 110 (e.g., CAN buses), because the vehicular security module 102, in this configuration, is removed from vehicle buses 108 and 110, and signals are permitted to be communicated throughout vehicle buses 108 and 110 without interacting with the vehicular security module (e.g., 102 of FIG. 1).

In some examples, connectors 502 and 508 according to the second embodiment herein may be configured so as to be switchable (e.g., via electrical switches, software, firmware, and/or the like) into and out of the vehicle's electrical system (e.g., CAN bus 108 and/or 110) to toggle the ability for a manufacturer-provided diagnostic tool to interface with vehicular security module 102 by way of diagnostic port 104 (e.g., the OBD2 port) that is originally installed in the vehicle.

The example embodiments described herein may be implemented using hardware, software or any combination thereof and may be implemented in one or more computer systems or other processing systems. Additionally, one or more of the steps described in the example embodiments herein may be implemented, at least in part, by machines. Example machines that may be useful for performing the operations of the example embodiments herein include general purpose digital computers, specially-programmed computers, desktop computers, server computers, client computers, portable computers, mobile communication devices, tablets, and/or similar devices.

The above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. An apparatus for bypassing a vehicular security module, comprising:
   a first connector comprising a plurality of pins; and
   a second connector comprising a plurality of pins, wherein:
      a first set of the plurality of pins of the first connector are electrically coupled to one another via a first electrical conductor,
      a second set of the plurality of pins of the first connector are electrically coupled to one another via a second electrical conductor,
      a first set of the plurality of pins of the second connector are electrically coupled to one another via a third electrical conductor, and
      a second set of the plurality of pins of the second connector are electrically coupled to one another via a fourth electrical conductor,
   wherein the first connector bypasses a vehicular security module of an automotive vehicle by replacing a first connector of the vehicular security module in a first electrical circuit comprising a first communication bus of the automotive vehicle.

2. The apparatus of claim 1, wherein:
   the first connector replaces the first connector of the vehicular security module by mating with a first communication bus connector coupled to the first communication bus in place of the first connector of the vehicular security module.

3. The apparatus of claim 1, wherein the first communication bus is a controller area network interior high speed (CAN-C) bus.

4. The apparatus of claim 1, wherein:
   the second connector bypasses the vehicular security module of the automotive vehicle by replacing a second connector of the vehicular security module in a second electrical circuit comprising a second communication bus of the automotive vehicle.

5. The apparatus of claim 4, wherein:
   the second connector replaces the second connector of the vehicular security module by mating with a second communication bus connector coupled to the second communication bus in place of the second connector of the vehicular security module.

6. The apparatus of claim 4, wherein the second communication bus is a controller area network C (CAN-IHS) bus.

7. The apparatus of claim 1, further comprising a diagnostic port coupled to the vehicular security module, wherein, when the first connector is mated with a first communication bus connector of a first communication bus of an automotive vehicle and the second connector is mated with a second communication bus connector of a second communication bus of the automotive vehicle, the diagnostic port is configured to provide electronic access to an electrical module diagnostic port of one or more electrical modules coupled to the first communication bus or the second communication bus.

8. The apparatus of claim 1, wherein at least one of the first, second, third, or fourth electrical conductors include a jumper.

9. The apparatus of claim 1, wherein the first set of the plurality of pins of the first connector comprises a third pin, a fourth pin, and a fifth pin of the first connector; the second set of the plurality of pins of the first connector comprises a tenth pin, an eleventh pin, and a twelfth pin of the first connector; the first set of the plurality of pins of the second connector comprises a first pin, a second pin, and a third pin of the second connector; and the second set of pins of the second connector comprises a sixth pin, a seventh pin, and an eighth pin of the second connector.

10. A method for bypassing a vehicular security module, comprising:
providing a first connector comprising a plurality of pins;
providing a second connector comprising a plurality of pins, wherein:
a first set of the plurality of pins of the first connector are electrically coupled to one another via a first electrical conductor,
a second set of the plurality of pins of the first connector are electrically coupled to one another via a second electrical conductor,
a first set of the plurality of pins of the second connector are electrically coupled to one another via a third electrical conductor, and
a second set of the plurality of pins of the second connector are electrically coupled to one another via a fourth electrical conductor; and
bypassing a vehicular security module of an automotive vehicle by utilizing the first connector to replace a first connector of the vehicular security module in a first electrical circuit comprising a first communication bus of the automotive vehicle.

11. The method of claim 10, wherein:
the first connector replaces the first connector of the vehicular security module by mating with a first communication bus connector coupled to the first communication bus in place of the first connector of the vehicular security module.

12. The method of claim 10, wherein the first communication bus is a controller area network interior high speed (CAN-C) bus.

13. The method of claim 10, wherein:
the second connector bypasses the vehicular security module of the automotive vehicle by replacing a second connector of the vehicular security module in a second electrical circuit comprising a second communication bus of the automotive vehicle.

14. The method of claim 13, wherein:
the second connector replaces the second connector of the vehicular security module by mating with a second communication bus connector coupled to the second communication bus in place of the second connector of the vehicular security module.

15. The method of claim 13, wherein the second communication bus is a controller area network C (CAN-IHS) bus.

16. The method of claim 10, further comprising providing a diagnostic port coupled to the vehicular security module, wherein, when the first connector is mated with a first communication bus connector of a first communication bus of an automotive vehicle and the second connector is mated with a second communication bus connector of a second communication bus of the automotive vehicle, the diagnostic port is configured to provide electronic access to an electrical module diagnostic port of one or more electrical modules coupled to the first communication bus or the second communication bus.

17. The method of claim 10, wherein at least one of the first, second, third, or fourth electrical conductors include a jumper.

18. The method of claim 10, wherein the first set of the plurality of pins of the first connector comprises a third pin, a fourth pin, and a fifth pin of the first connector, the second set of the plurality of pins of the first connector comprises a tenth pin, an eleventh pin, and a twelfth pin of the first connector, the first set of the plurality of pins of the second connector comprises a first pin, a second pin, and a third pin of the second connector, and the second set of pins of the second connector comprises a sixth pin, a seventh pin, and an eighth pin of the second connector.

* * * * *